(12) United States Patent
Goto et al.

(10) Patent No.: US 7,802,906 B2
(45) Date of Patent: Sep. 28, 2010

(54) LOW PROFILE LAMP ASSEMBLY

(75) Inventors: Kazuhiro Goto, Markham (CA); Dorin Lazuran, Richmond Hill (CA)

(73) Assignee: Tyco Electronics Canada ULC, Ontario (CA)

( * ) Notice: Subject to any disclaimer, the term of this patent is extended or adjusted under 35 U.S.C. 154(b) by 135 days.

(21) Appl. No.: 12/272,304

(22) Filed: Nov. 17, 2008

(65) Prior Publication Data

US 2009/0129100 A1 May 21, 2009

Related U.S. Application Data

(60) Provisional application No. 61/003,666, filed on Nov. 19, 2007.

(51) Int. Cl.
*F21V 17/06* (2006.01)

(52) U.S. Cl. .................. 362/433; 362/147; 362/382

(58) Field of Classification Search .......... 362/433, 362/382, 548, 490, 147, 364; 439/544, 548, 439/549, 550, 552–559

See application file for complete search history.

(56) References Cited

U.S. PATENT DOCUMENTS

| | | | | |
|---|---|---|---|---|
| 5,368,503 A | * | 11/1994 | Savage, Jr. | 439/502 |
| 5,722,758 A | * | 3/1998 | Huang | 362/548 |
| 5,818,995 A | | 10/1998 | Savage, Jr. | |
| 6,152,568 A | * | 11/2000 | Baba et al. | 362/23 |
| 6,174,071 B1 | * | 1/2001 | Chan | 362/187 |
| 2007/0041166 A1 | | 2/2007 | Lin | |

FOREIGN PATENT DOCUMENTS

| | | |
|---|---|---|
| GB | 2 333 910 | 8/1999 |
| WO | WO 2005/043036 | 5/2005 |

* cited by examiner

*Primary Examiner*—Gunyoung T Lee

(57) ABSTRACT

A lamp assembly for mounting to a panel includes a housing assembly having a lamp section holding a light source assembly, and a lens section extending from the lamp section. The lens section has a lens through which light from the light source assembly is directed, wherein the lens is configured to be received within a mounting opening of the panel. A locking tab extends from an outer surface of the lens section, wherein the locking tab is configured to be received within the mounting opening of the panel and wherein the locking tab is configured to engage a locking surface to secure the housing assembly relative to the panel.

20 Claims, 8 Drawing Sheets

LOW PROFILE LAMP ASSEMBLY

CROSS REFERENCE TO RELATED APPLICATIONS

This application claims the benefit of U.S. Provisional Application No. 61/003,666 filed Nov. 19, 2007, the subject matter of which is herein incorporated by reference in its entirety.

BACKGROUND OF THE INVENTION

The subject matter herein relates generally to lamp assemblies, and more particularly, to a low profile panel mounted lamp assembly.

Recent technological advances in low voltage light sources, such as light emitting diodes (LEDs), now present low voltage light sources as viable candidates as light sources. Low voltage light sources operate at a small fraction of the electrical power of conventionally used light sources and are an attractive option due to generally lower cost and higher efficiency than conventionally used light sources.

A specific use of an LED based light may be a small pin light for spot illumination. These pin spot lights may be panel mounted for directing the illumination. In some proposed applications, the entire pin spot lamp assembly must be small to fit in particularly tight spaces. Additionally, the lamp must be accessible for repair or replacement. Conventional designs provide securing features, such as latches, for securing the lamp assembly to the panel outside of the lamp housing. For example, the latches extend from the panel and capture the lamp assembly over the outside of the lamp housing to secure the lamp housing to the panel. Such latches makes the overall size of the lamp assembly very large and makes it less pleasing aesthetically and also makes it difficult to package the lamp assembly in very tight spots, which is often an issue with applications such as lighting in an automotive interior.

BRIEF DESCRIPTION OF THE INVENTION

In one embodiment, a lamp assembly is provided for mounting to a panel. The lamp assembly includes a housing assembly having a lamp section holding a light source assembly, and a lens section extending from the lamp section. The lens section has a lens through which light from die light source assembly is directed, wherein the lens is configured to be received within a mounting opening of the panel. A locking tab extends from an outer surface of the lens section, wherein the locking tab is configured to be received within the mounting opening of the panel and wherein the locking tab is configured to engage a locking surface to secure the housing assembly relative to the panel.

Optionally, the housing assembly may be rotated in a locking direction until the locking tab engages the locking surface and is in a locked position. The locking tab may be loaded through a tab opening defined within the mounting opening, where the tab opening provides access to die locking surface. Optionally, the lens section may be inserted into the mounting opening such that the locking tab passes through at least a portion of the panel to engage the locking surface. The panel may have an inner surface and an outer surface, where the housing assembly is mounted to the panel such that the lens directs light in a direction from the inner surface to the outer surface. The locking tab engages the locking surface outward with respect to the inner surface. Optionally, the panel may define the locking surface and the locking tab may directly engage the panel to secure the housing assembly to the panel.

In another embodiment, lamp assembly for mounting to a panel is provided that includes a housing assembly having a lens section and a locking tab extending from an outer surface of the lens section. A panel mounting member is configured to be received within a mounting opening of the panel. The panel mounting member is configured to be secured to the panel. The panel mounting member has a mounting cavity therein having a locking surface, wherein the locking tab is received within the mounting cavity such that the lens section is received within the mounting opening of the panel. The locking tab engages the locking surface to secure the housing assembly to the panel mounting member.

In a further embodiment, a lamp assembly is provided for mounting to a panel having a mounting opening with two tab openings. The lamp assembly includes a housing assembly having a lens portion and locking tabs extending from an outer surface of the lens portion. The lens portion of the lamp assembly is configured to be placed within the mounting opening so that the locking tabs fall into the tab openings, and the lamp assembly is rotated in a locking direction so that the locking tabs lock the lamp assembly to the panel.

DETAILED DESCRIPTION OF THE INVENTION

Figure 1:
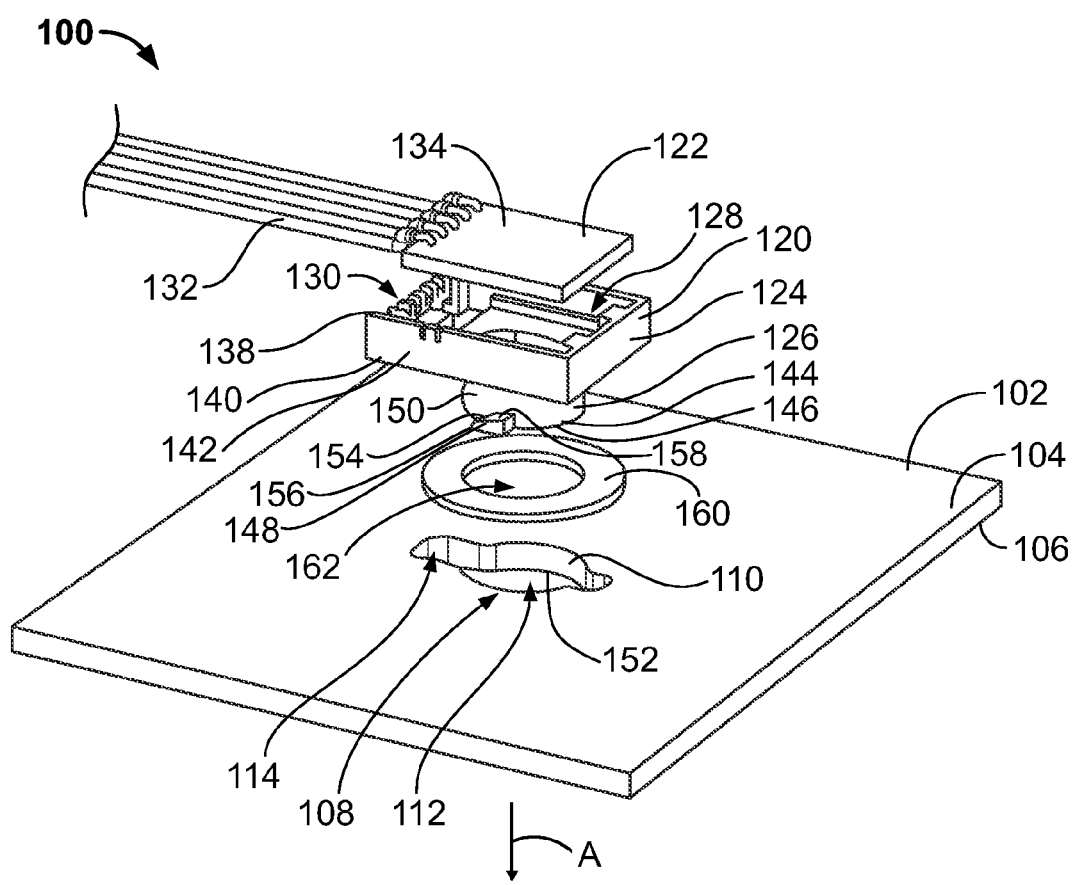
FIG. 1 is an exploded perspective view of an exemplary embodiment of a low profile, panel mount lamp assembly mounted to a panel.

FIG. 1 is an exploded perspective view of an exemplary embodiment of a low profile, panel mount lamp assembly 100 mounted to a panel 102. The lamp assembly 100 is directly mounted to the panel 102. In an exemplary embodiment, the panel 102 does not include any features, such as latches, that extend over the lamp assembly 100 to secure the lamp assembly 100 to the panel 102. As such, the lamp assembly 100 maintains a low profile with respect to the panel 102.

The panel 102 is generally planar and includes an inner surface 104 and an outer surface 106. The lamp assembly 100 is provided along the inner surface 104. The outer surface 106 is generally exposed to the environment that is to be illuminated by the lamp assembly 100. As such, the light is directed in a direction from the inner surface 104 towards the outer surface 106, such as a direction shown by the arrow A. The light is intended to be directed beyond, or outward from, the outer surface 106.

The panel 102 includes a mounting opening 108. The mounting opening 108 is sized to receive at least a portion of lamp assembly 100. The mounting opening 108 is defined by walls 110 that extend between the inner and outer surfaces 104, 106. In an exemplary embodiment, the mounting opening 108 includes a primary opening 112 and one or more secondary openings 114. The primary and secondary openings 112, 114 receive different portions of the lamp assembly 100, as will be described in further detail below. The secondary openings 114 are smaller than the primary opening 112. Optionally, the primary opening 112 may be generally cylindrical in shape, however other shapes are possible in alternative embodiments.

The lamp assembly 100 includes a housing assembly 120 and a light source assembly 122 received in the housing assembly 120. The housing assembly 120 includes a lamp section 124 that holds the light source assembly 122 and a lens section 126 that extends from the lamp section 124. The lamp section 124 defines a cavity 128 that receives the light source assembly 122. In an exemplary embodiment, the lamp section 124 includes one or more wire grooves 130 that receive wires 132 used for powering the light source assembly 122. Optionally, the light source assembly 122 may include a circuit board 134 and one or more lights 136 (shown in FIG. 4), such as light emitting diodes (LEDs). The wires 132 are terminated to circuit board 134 for powering the LEDs 136. The light source assembly 122 is received in the cavity 128 such that the LEDs 136 face the lens section 126.

The lamp section 124 includes a top 138 and a bottom 140. Sidewalls extend between the top 138 and the bottom 140 and define an outer edge 142 of the lamp section 124. The lamp assembly 100 is coupled to the panel 102 such that the bottom 140 generally faces the panel 102 and the top 138 generally faces away from the panel 102. The lens section 126 extends from the bottom 140 of the lamp section 124. The light source assembly 122 is received within the cavity 128 generally near the top 138 of the lamp section 124. The wire grooves 130 open at the top 138 such that the wires 132 can be loaded into the wire grooves 130 through the top 138. In an exemplary embodiment, when the light source assembly 122 is received in the cavity 128, the light source assembly 122 and the associated components are positioned below the top 138 of the lamp section 124. As such, the top 138 of the lamp section 124 defines an uppermost surface of the lamp assembly 100 when the lamp assembly 100 is mounted to the panel 102. The profile, or height, of the lamp assembly 100, as measured from the panel 102, is defined by the top 138 of lamp section 124.

The lens section 126 extends generally downward or away from lamp section 124. The lens section 126 may be sized and/or shaped to control and/or focused the light generated by the light source assembly 122. In the illustrated embodiment, the lens section 126 is generally cylindrical in shape, however other shapes are possible in alternative embodiments. The lens section 126 includes a lens 144 at an end 146 of the lens section 126. The lens 144 may be integrally formed with a lens section 126, or alternatively, may be separately provided from, and coupled to, the lens section 126. Optionally, the lens section 126 may be integrally formed with the lamp section 124 as part of a one-piece housing. Alternatively, the lens section 126 may be coupled to the lamp section 124.

In an exemplary embodiment, the lens section 126 includes one or more locking tabs 148 that extend outward from an outer surface 150 of the lens section 126. Optionally, the locking tabs 148 may be positioned proximate to the end 146 of the lens section 126. The locking tabs 148 are used to secure the lamp assembly 100 to the panel 102. In the illustrated embodiment, the locking tabs 148 directly engage the panel 102 to couple the lamp assembly 100 to the panel 102.

During assembly, the lens section 124 and the corresponding locking tabs 148 are loaded into the mounting opening 108. For example, the lamp assembly 100 is oriented with respect to the mounting opening 108 such that the locking tabs 148 are aligned with the secondary openings 114. The secondary openings 114 thus define tab openings, and may be referred to hereinafter as tab openings 114. The lens section 126 is loaded at least partially through the mounting opening 108. The lens section 126 may be loaded into the mounting opening 108 until the locking tabs 148 are aligned with a locking surface 152 defined by, or provided within, the panel 102. The lens section 126 may be loaded into the mounting opening 108 until the bottom 140 of the lamp section 124 bottoms out against the inner surface 104 of the panel 102, or until the lamp section 124 bottoms out against a gasket 160 when provided.

To secure the lamp assembly 100 to the panel 102, the locking tabs 148 engage the locking surface 152. In the illustrated embodiment, the outer surface 106 of the panel 102 defines the locking surface 152. Alternatively, the walls 110 defining the mounting opening 108 may define the locking surface 152. In other alternative embodiments, other components may be coupled to the panel 102 to define the locking surface 152. In an exemplary embodiment, the lamp assembly 100 may be initially mated with the panel 102 by loading the lens section 126 into the mounting opening 108, after which the lamp assembly 100 may be moved in a locking direction to a final, or locked position, in which the locking tabs 148 engage the locking surface 152. In an exemplary embodiment, the lamp assembly 100 is rotated in a locking direction to the locked position, however in alternative embodiments, the lamp assembly 100 may be moved in a different locking direction, such as a linear direction by sliding lamp assembly 100 with respect the panel 102. When rotated or otherwise moved, the locking tabs 148 engage the locking surface 152 to secure the lamp assembly 100 relative to the panel 102. For example, once the locking tabs 148 pass through the panel 102, the lamp assembly 100 is rotated so that the locking tabs 148 move below the outer surface 106 of the panel 102 and lock the lamp assembly 100 to the panel 102.

In an exemplary embodiment, the locking tabs 148 include ramp surfaces 154 that facilitate the tightening of the lamp assembly 100 to a locked position. Optionally, the ramp surfaces 154 extend from a tip 156 to landing 158, with the locking tab 148 being thicker in the vicinity of the landing 158 than at the tip 156. As the lamp assembly 100 is moved in a locking direction, the tip 156 initially engages the locking surface 152. The lamp assembly 100 is rotated in the locking direction at least until the landing 158 engages the locking surface 152. The landing 158 provides a flat surface for engaging the locking surface 152 to resist backing out of the lamp assembly 100 in a direction opposite to the locking direction.

Optionally, a gasket 160 may be provided. The gasket 160 may be positioned between the housing assembly 120 and the panel 102. Optionally, the gasket 160 may include an opening 162 that receives the lens section 126. During assembly, the gasket 160 is loaded over the lens section 126 and rests near, or adjacent to, the lamp section 124. When the lamp assembly 100 is coupled to the panel 102, the gasket 160 may be at least partially compressed. The gasket 160 may reduce vibration of the lamp assembly 100, which may provide a more secure connection between the lamp assembly 100 in the panel 102. For example, the gasket 160 may reduce the tendency of the lamp assembly 100 to twist or move out of the locked position. The gasket 160 may also accommodate manufacturing tolerances of the lamp assembly 100 or the panel 102.

Figure 2:
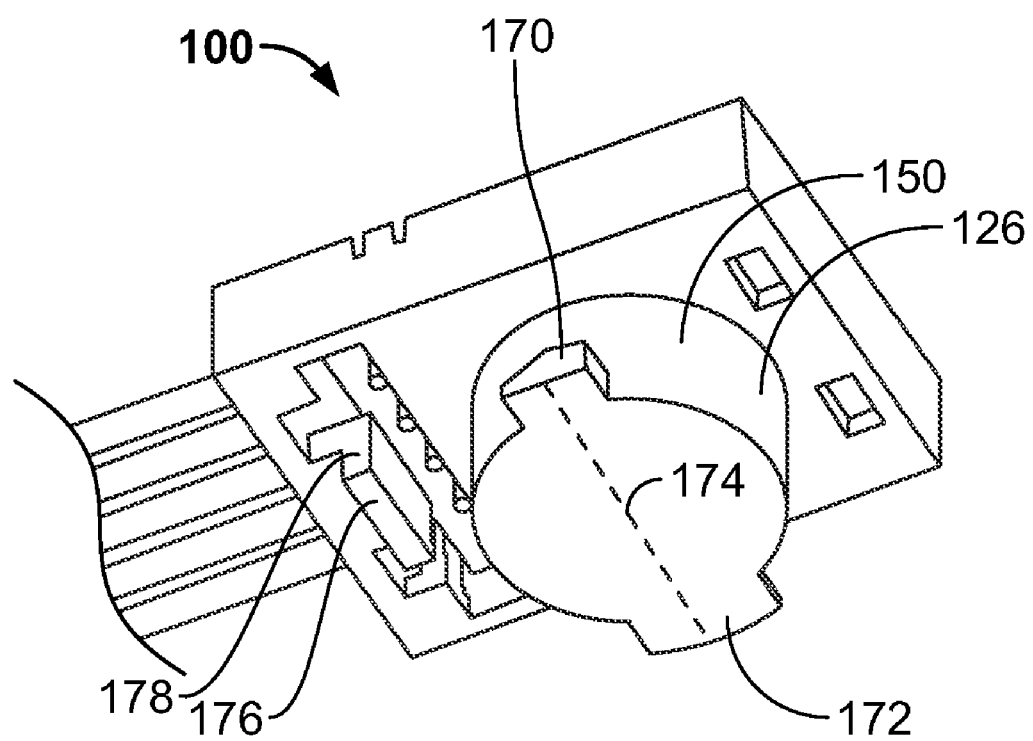
FIG. 2 is a bottom perspective view of the lamp assembly of FIG. 1.

FIG. 2 is a bottom perspective view of the lamp assembly 100. In the illustrated embodiment, the lamp assembly 100 includes a pair of locking tabs 148 represented by a first locking tab 170 and a second locking tab 172. The locking tabs 170, 172 have different shapes, with the first locking tab 170 being skinnier and the second locking tab 172 being wider. The different shapes of the locking tabs 170, 172 defined a keying feature of the lamp assembly 100. For example, the tab openings 114 (shown in FIG. 1) of the mounting opening 108 (shown in FIG. 1) may be shaped differently to accommodate corresponding locking tabs 170, 172. The tab openings 114 receive the locking tabs 170, 172. In an exemplary embodiment, the locking tabs 170, 172 extend radially outward from the outer surface 150 of the lens section 126. The locking tabs 170, 172 are aligned with one another along a tab axis 174 on opposite sides of the lens section 126.

In an exemplary embodiment, the lamp assembly 100 includes at least one orientation feature 176. The orientation feature 176 orients the lamp assembly 100 in a proper orientation with respect to the panel 102 (shown in FIG. 1). In the illustrated embodiment, the orientation feature 176 constitutes a latch that engages a portion of the panel 102 to orient the lamp assembly 100 with respect the panel 102. For example, a catch portion 178 of the orientation feature 176 is configured be received within one of secondary openings 114 (shown in FIG. 1) of the mounting opening 108. As such, the corresponding secondary openings 114 define an orientation feature of the panel 102, and may be referred to hereinafter as an orientation feature 114.

With reference to FIGS. 1 and 2, the orientation feature 114 represents a slot which may capture the catch portion 178 of the orientation feature 176 when the orientation feature 176 is aligned with the orientation feature 114. The orientation feature 176 is offset by a predetermined angle with respect to the tab axis 174. In the illustrated embodiment, the orientation feature 176 is offset approximately 90° with respect to the tab axis 174. As such, when the lens section 126 is initially loaded into the mounting opening 108, the first and second locking tabs 170, 172 are aligned with the secondary openings 114. Additionally, when the lamp assembly 100 is initially mated with the panel 102, the orientation feature 176 is offset with respect to the orientation feature 114. During locking of the lamp assembly 100 to the panel 102, the lamp assembly 100 is rotated to the locked position. In an exemplary embodiment, the lamp assembly 100 is rotated until the orientation feature 176 is aligned with the orientation feature 114. The catch portion 178 is at least partially received within the secondary opening 114 when the orientation features 176, 114 are aligned. The catch portion 178 may engage one of the walls 110 to resist counter rotation of the lamp assembly 100 in a direction opposite to the locking direction. The orientation features 176, 114 thus operate to lock the lamp assembly 100 in position relative to the panel 102.

Figure 3:
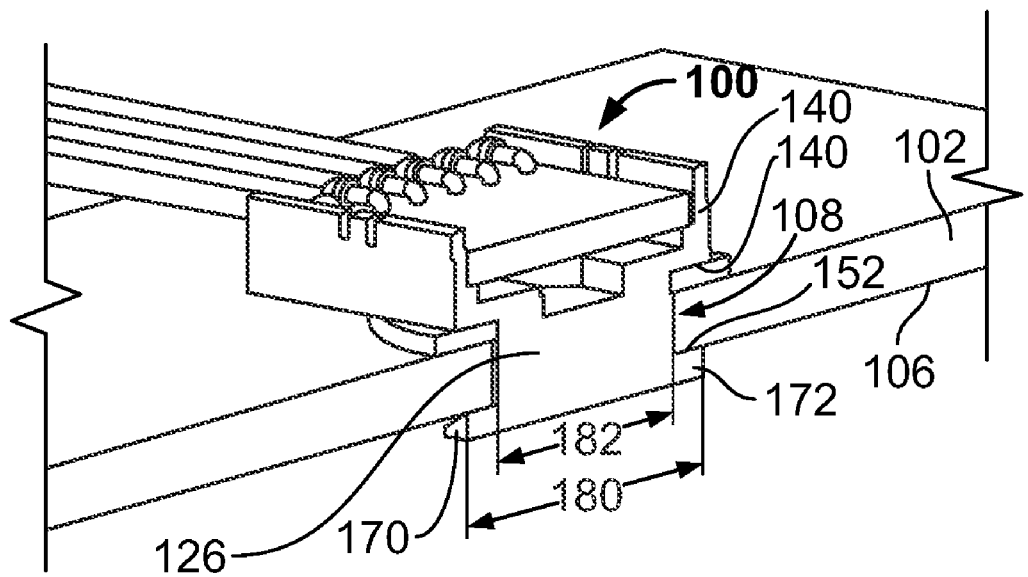
FIG. 3 is a section view of the lamp assembly of FIG. 1.
Figure 4:
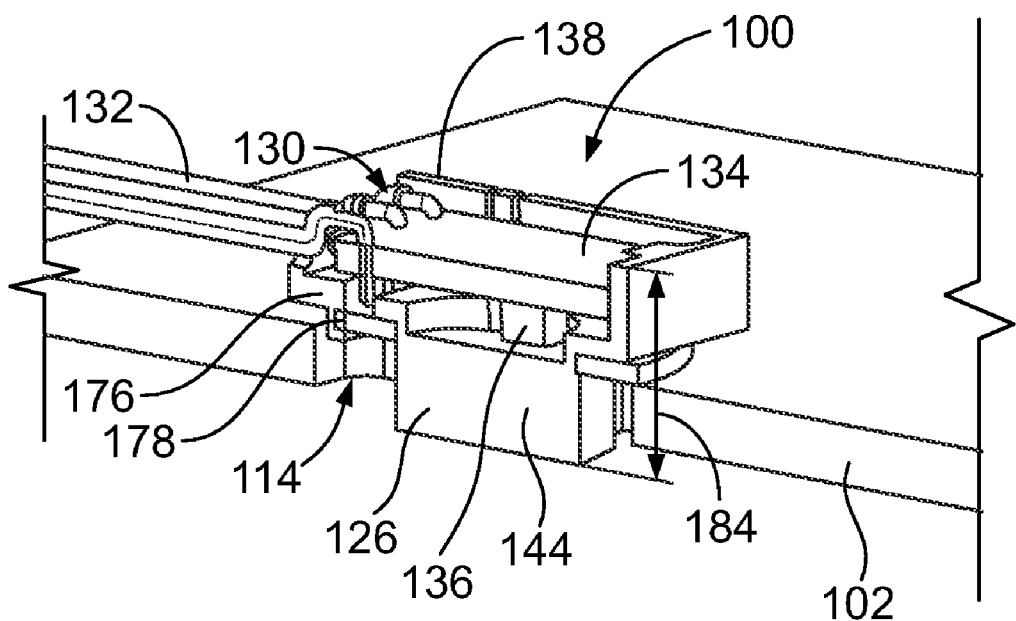
FIG. 4 is another section view of the lamp assembly of FIG. 1.

FIG. 3 is a section view of the lamp assembly 100 taken along the locking tabs 170, 172 and FIG. 4 is a section view of the lamp assembly 100 taken along the secondary openings 114 of the mounting opening 108. The lamp assembly 100 is illustrated in the locked position with respect to the panel 102. As illustrated in FIG. 3, the lens section 126 is loaded to the mounting opening 108 and the first and second locking tabs 170, 172 are positioned along the outer surface 106 of the panel 102. The outer surface 106 defines the locking surface 152. The locking tabs 170, 172 engage the panel 102 to resist removal of the lamp assembly from the mounting opening 108. For example, the lens section 126 at the locking tabs 170, 172 has a width 180 that is wider than a width 182 of the primary opening 112. The panel 102 is captured between the bottom 140 of the lamp section 124 and the locking tabs 170, 172.

FIG. 4 illustrates the catch portion 178 of the orientation feature 176 received within the orientation feature (the secondary opening) 114. FIG. 4 also illustrates the LED 136 aligned with the lens 144 of the lens section 126. Light is directed from the LED 136, through the lens 144, and outward from the panel 102. FIG. 4 also illustrates the wires 132 located within the wire grooves 130. Optionally, the wires 132 do not extend beyond the top 138 of lamp section 124. The wire grooves 130 permit the wires 132 to be installed so that the overall profile of the lamp assembly is decreased.

In an exemplary embodiment, because of the provision of the locking tabs 170, 172 for securing the lamp assembly 100 to the panel 102, a separate latching feature is not needed to secure the lamp assembly 100 to the panel 102. For example, a latch or other components does not extend over the top 138 of the lamp section 124 to hold the lamp section 124 against the panel 102. As such, the overall height or profile 184 of the combination of the lamp assembly 100 and the panel 102 is defined by the top 138 of the housing assembly 120. As such, the panel 102 may be held close to another structure, and space is not wasted above the housing assembly 120 with features for holding the housing assembly 120 against the panel 102. The lamp assembly 100 is thus considered low profile as compared to assemblies that utilize latches, clamps, or other devices above the housing to hold the housing to the panel 102. In the illustrated embodiment, the profile 184 is approximately equal to the thickness of the lens 144, the LED 136, circuit board 134 and the termination of the wires 132.

Figure 5:
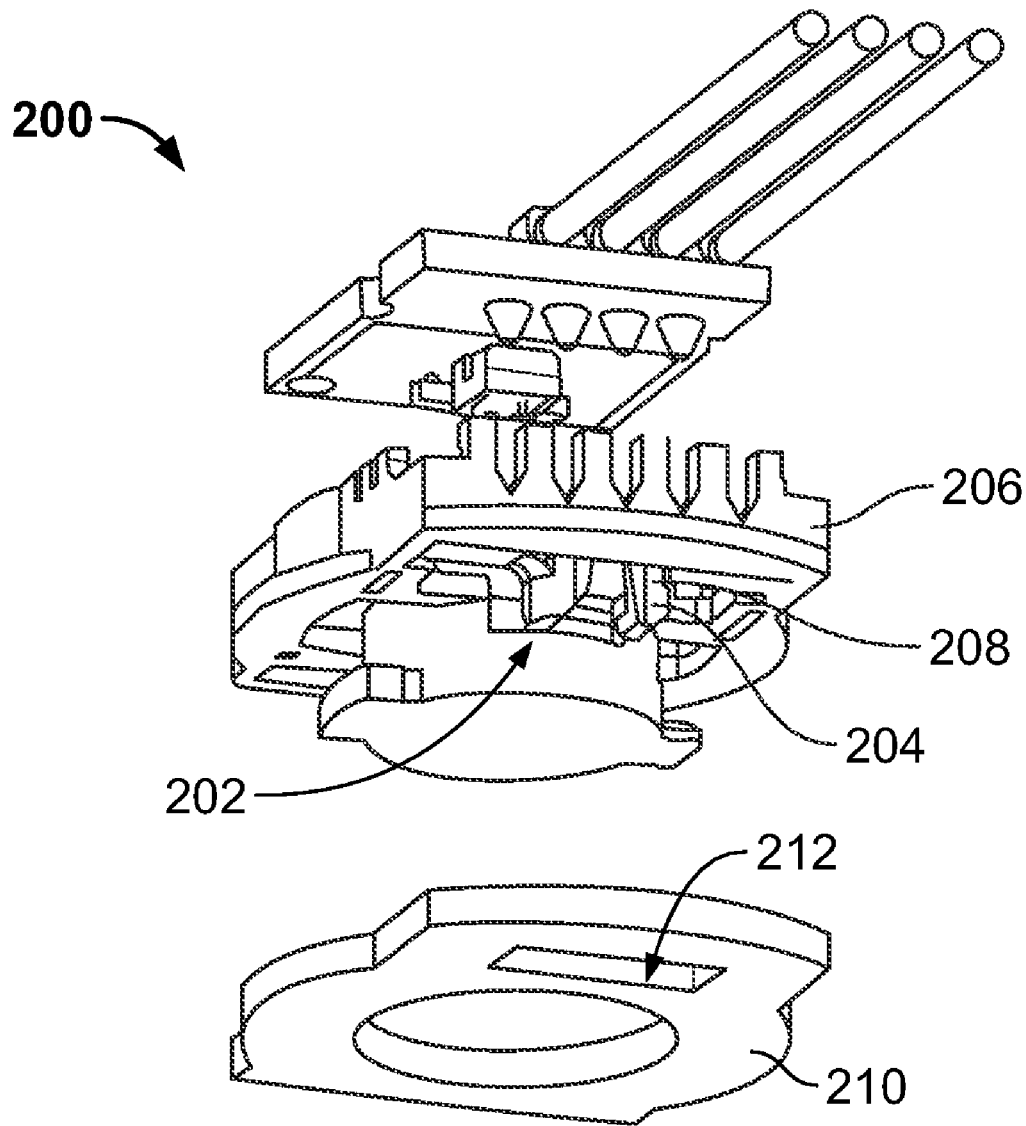
FIG. 5 is an exploded perspective view of an alternate embodiment of a lamp assembly.

FIG. 5 is an exploded perspective view of an alternate embodiment of a lamp assembly 200. The lamp assembly 200 is similar to the lamp assembly 100 (shown in FIGS. 1-4), however the lamp assembly 200 includes a different orientation feature 202 as compared to lamp assembly 100. The orientation feature 202 includes a pair of latches 204 extending from a housing assembly 206. The latches 204 have arms 208 that are separate from one another to allow independent movement of the latches 204. The latches 204 are designed to fit within the corresponding orientation feature of the panel (not shown). The orientation feature of the panel may be an opening. The opening may be part of the mounting opening of the panel, such as with the mounting opening 108 (shown in FIG. 1), or alternatively the opening may be separate from the mounting opening.

The lamp assembly 200 includes a gasket 210. The gasket 210 includes a latch opening 212 that receives the latches 204 when the gasket 210 is coupled to the housing assembly 206. The gasket 210 is moved with the housing assembly 206 as the housing assembly 206 is moved in the locking direction.

Figure 6:
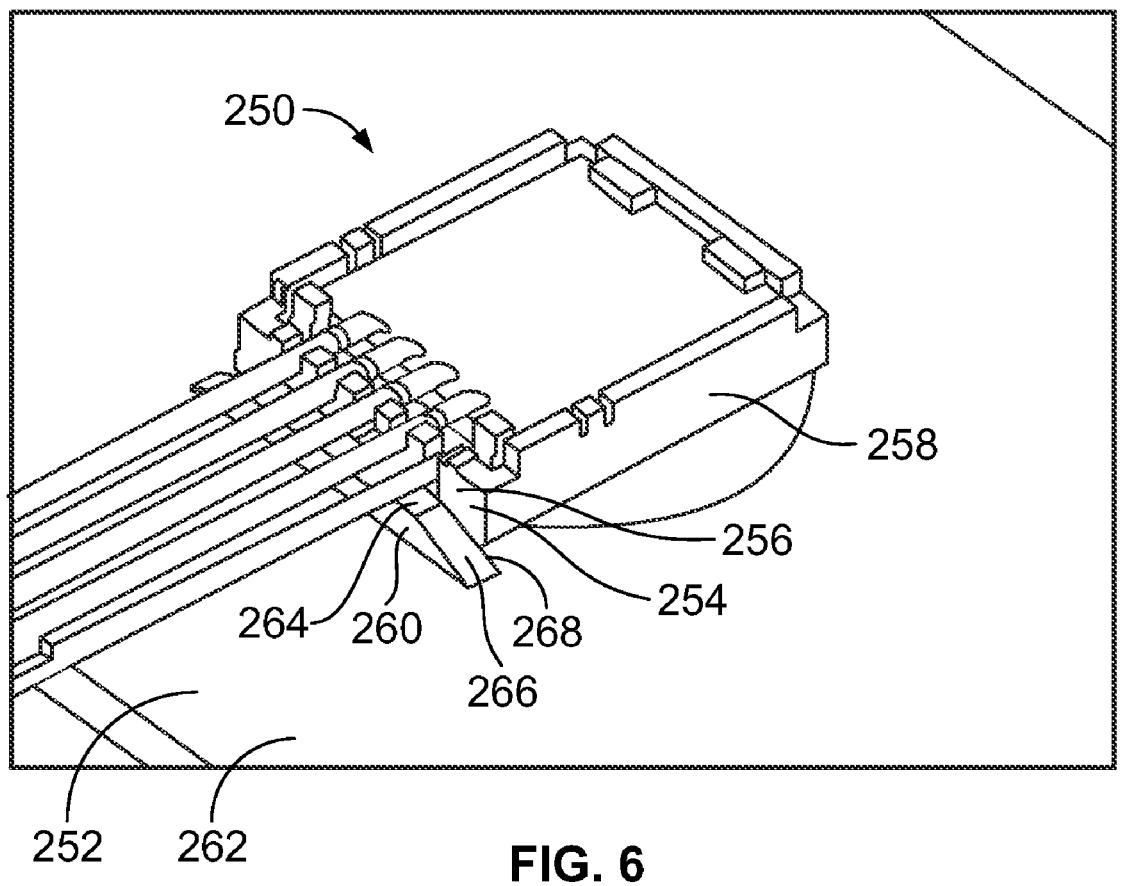
FIG. 6 is an exploded perspective view of yet another alternative embodiment of a lamp assembly.

FIG. 6 is an exploded perspective view of yet another alternative embodiment of a lamp assembly 250 mounted to a panel 252. The lamp assembly 250 is similar to the lamp assembly 100 (shown in FIGS. 1-4), however the lamp assembly 250 includes a different orientation feature 254 as compared to lamp assembly 100. In the illustrated embodiment, the orientation feature 254 is represented by an outer edge 256 of the housing assembly 258. The orientation feature 254 is a wall of the housing assembly 258.

The panel 252 includes an orientation feature 260 represented by a rib extending from an inner surface 262 of the panel 252, and may be referred to hereinafter as an orientation rib 260. The orientation rib 260 includes a top 264 opposite the panel 252. The orientation rib 260 includes one or more ramp surfaces 266 at the outer edges of the orientation rib 260.

During locking of the lamp assembly 250 to the panel 252, the housing assembly 258 is rotated until the outer edge 256 of the housing assembly 258 engages an inner surface 268 of the orientation rib 260. Optionally, as the housing assembly 258 is rotated in the locking direction, the housing assembly 258 may engage the ramp surface 266 and ride along the orientation rib 260 until the housing assembly 258 is in a locked position. In the locked position, the outer edge 256 of the housing assembly 258 is aligned with the inner surface 268 and drops down along the inner surface 268. When the orientation features 254, 260 engage one another, the orientation features 254, 260 retain the housing assembly 258 in the locked position with respect to the panel 252. For example, the orientation features 254, 260 resist twisting or movement of the housing assembly 258 in a direction that is opposite to the locking direction.

Figure 7:
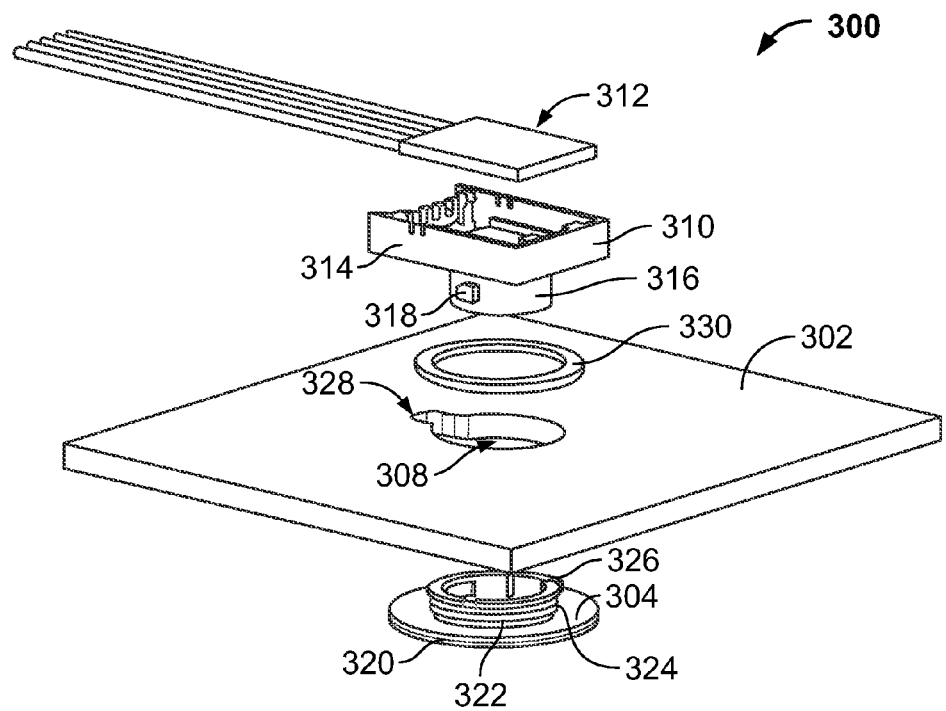
FIG. 7 is an exploded perspective view of a further alternative embodiment of a lamp assembly using a bezel to mount the lamp assembly to the panel.

FIG. 7 is an exploded perspective view of a further alternative embodiment of a lamp assembly 300 mounted to a panel 302 using a panel mounting member 304. The panel 302 includes a mounting opening 306. The panel mounting member 304 may be received within, and secured to, the mounting opening 308.

The lamp assembly 300 includes a housing assembly 310 and a light source assembly 312 received in the housing assembly 310. The housing assembly 310 includes a lamp section 314 and a lens section 316 extending from the lamp section 314. The lens section 316 includes one or more locking tabs 318 extending therefrom. The locking tabs 318 are configured to be coupled to the panel mounting member 304 to secure the lamp assembly 300 to the panel 302.

In the illustrated embodiment, the panel mounting member 304 constitutes a bezel, and may be referred to hereinafter as a bezel 304. The bezel 304 includes a head 320 and a stem 322 extending from the head 320. The stem 322 may be received in the mounting opening 308 until the head 320 rests against the panel 302. The stem 322 may be held against the mounting opening 308 via a friction fit. Optionally, the stem 322 may include a plurality of ribs 324 circumscribing at least a portion of the stem 322. The ribs 324 may be compression fit within the mounting opening 308 to hold the bezel 304 within the mounting opening 308. The bezel 304 may be secured to the panel 302 by alternative means or features in alternative embodiments.

In an exemplary embodiment, the bezel 304 may include an orientation feature 326 for orientating the bezel 304 with respect to the panel 302. Optionally, the orientation feature 326 may be a projection extending outward from the stem 322. The orientation feature 326 may be mated with a corresponding orientation feature 328 of the panel 302. The orientation feature 328 of the panel may be an opening or slot extending from a predetermined portion of the mounting opening 308. Other types of orientation Features 326, 328 may be provided in alternative embodiments.

A gasket 330 may be provided between the lamp assembly 300 and the panel 302. The gasket 330 may surround the lens section 316 and be positioned between the housing assembly 310 and the surface of the panel 302.

Figure 8:
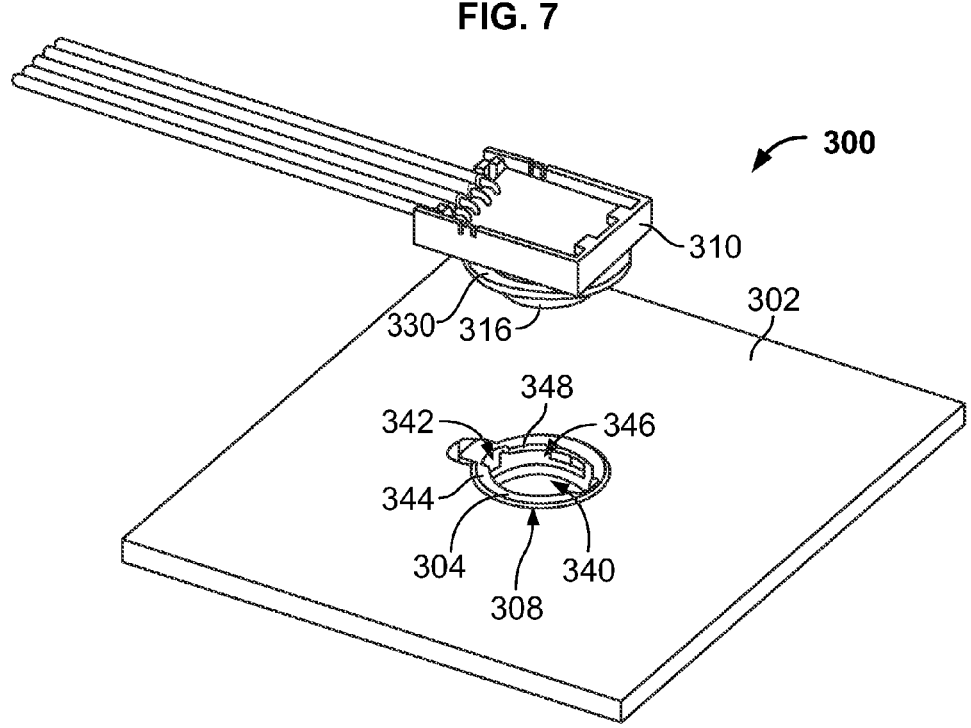
FIG. 8 is a perspective view of the embodiment of FIG. 7 just prior to mounting to the panel.

FIG. 8 is a perspective view of the lamp assembly 300 just prior to mounting to the panel 302. The bezel 304 is received within the mounting opening 308 for receiving the housing assembly 310. The gasket 330 is illustrated as being mounted to the housing assembly 310. During assembly, the lens section 316 is dropped into the bezel 304, and the locking tabs 318 (shown in FIG. 7) may be secured to the bezel 304 to securely couple the lamp assembly 300 to the panel 302.

The bezel 304 includes a mounting cavity 340 for receiving the lens section 316. Optionally, the mounting cavity 340 may be sized similar to the lens section 316. The bezel 304 includes tab openings 342 open at a top 344 of the bezel 304 for receiving the locking tabs 318. In the illustrated embodiment, two tab openings 342 are provided on opposite sides of the bezel 304. Each tab opening 342 opens to a corresponding tab slot 346 formed in the sidewall of the panel mounting member 304. The tab slots 346 receive the locking tabs 318 when the housing assembly 310 is rotated in locking direction. The tab slots 346 are defined, at least in part, by locking surfaces 348. When the housing assembly 310 is rotated, the locking tabs 318 engage the locking surfaces 348 of the tab slots 346. When the housing assembly 310 is rotated to the locked position, the locking surfaces 348 cover the locking tabs 318 to resist movement of the housing assembly 310 away from the panel 302. As such, the locking tabs 318 and the locking surfaces 348 cooperate to secure the housing assembly 310 to the bezel 304.

Figure 9:
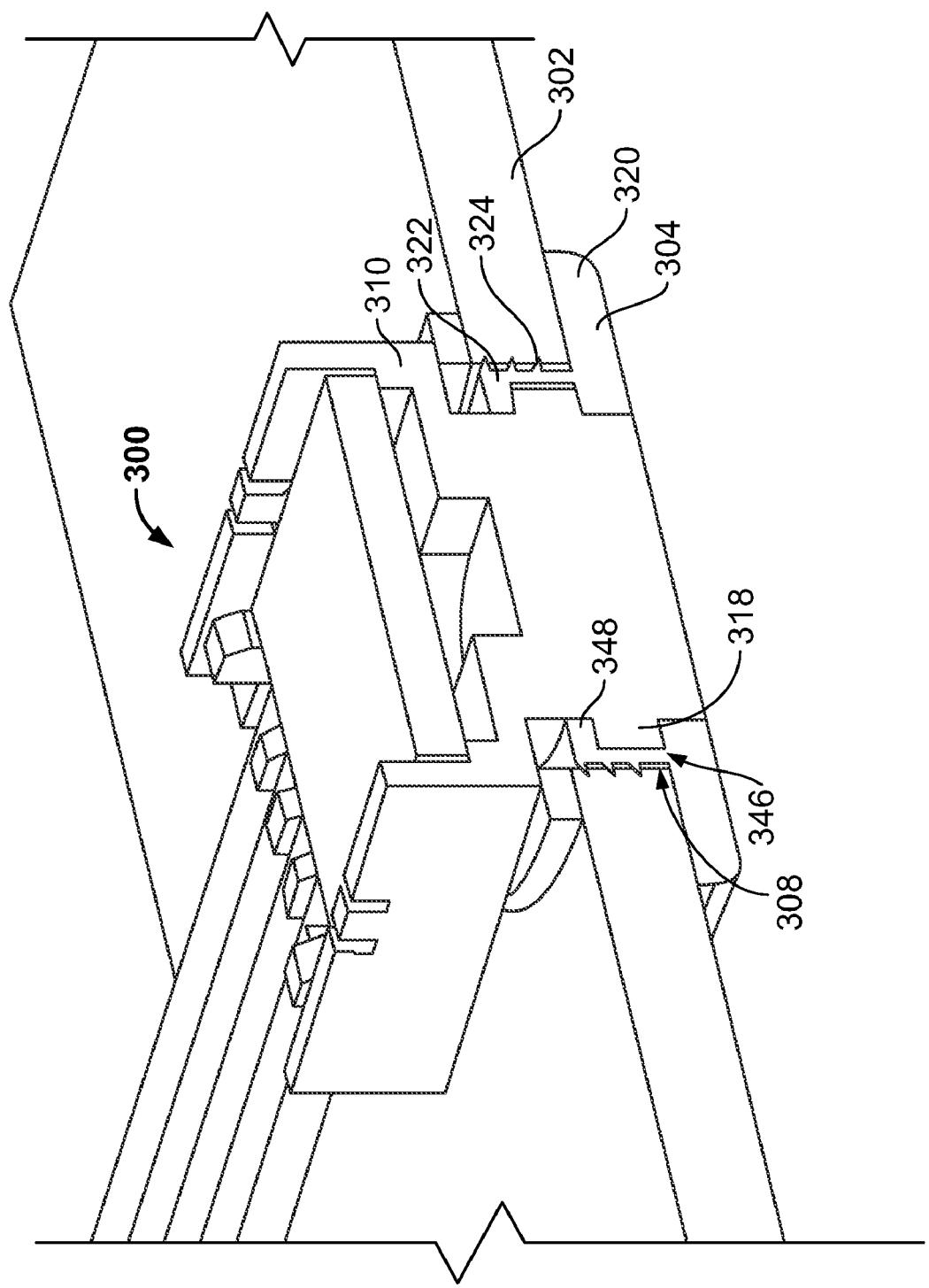
FIG. 9 is a section view of the lamp assembly of FIG. 7.

FIG. 9 is a section view of the lamp assembly 300. The bezel 304 is coupled to the panel 302 such that the head 320 rests against the panel 302. The ribs 324 hold the stem 322 within the mounting opening 308. The housing assembly 310 is coupled to the bezel 304 to secure the lamp assembly 300 to the panel 302. FIG. 9 illustrates the locking tabs 318 within the tab slots 346. The locking tabs 318 engage the locking surfaces 348 to resist movement of the housing assembly 310 away from the panel 302.

Figure 10:
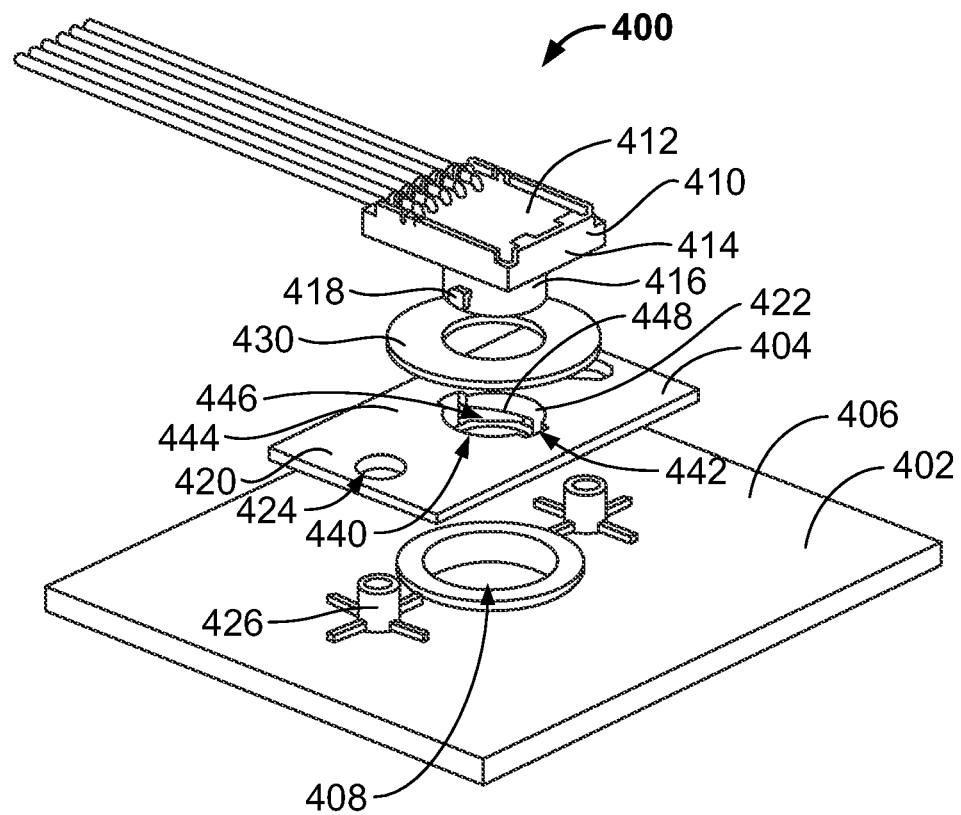
FIG. 10 is an exploded perspective view of yet another alternate embodiment of a lamp assembly using a mounting bracket to mount the lamp assembly to a panel.

FIG. 10 is an exploded perspective view of yet another alternate embodiment of a lamp assembly 400 mounted to a panel 402 using a panel mounting member 404. The panel 402 includes a mounting opening 408. The panel mounting member 404 extends along an inner surface 406 of the panel 402. The panel mounting member 404 may be at least partially received within the mounting opening 408.

The lamp assembly 400 includes a housing assembly 410 and a light source assembly 412 received in the housing assembly 410. The housing assembly 410 includes a lamp section 414 and a lens section 416 extending from the lamp section 414. The lens section 416 includes one or more locking tabs 418 extending therefrom. The locking tabs 418 are configured to be coupled to the panel mounting member 404 to secure the lamp assembly 400 to the panel 402.

In the illustrated embodiment, the panel mounting member 404 constitutes a mounting bracket, and may be referred to hereinafter as a mounting bracket 404. The mounting bracket 404 includes a plate 420 and a stem 422 extending from die plate 420. The stem 422 is received in the mounting opening 408 when the plate 420 rests against the inner surface 406 of the panel 402. The outer surface of the stem 422 may rest against the walls defining the mounting opening 408. The plate 420 may include a pair of mounting holes 424 that receive mounting posts 426 extending from the inner surface 406 of the panel 402. The plate 420 may be secured to panel 402 by fasteners (not shown) that are secured to the mounting posts 426. Alternatively, the mounting posts 426 may be deformable, such that after the plate 420 is mounted on the mounting posts 426, the mounting posts 426 are deformed to secure the plate 420 to the panel 402. The mounting bracket 404 may be secured to the panel 402 by alternative means or features in alternative embodiments.

A gasket 430 may be provided between the lamp assembly 400 and the mounting bracket 404. The gasket 430 may surround the lens section 416 and be positioned between the housing assembly 410 and the mounting bracket 404. Optionally, the gasket 430 may be split to fit around the lens section 416.

During assembly, the lens section 416 is dropped into the mounting bracket 404, and the locking tabs 418 (shown in FIG. 7) may be secured to the mounting bracket 404 to secure the couple the lamp assembly 400 to the panel 402.

The mounting bracket 404 includes a mounting cavity 440 for receiving the lens section 416. Optionally, the mounting cavity 440 may be sized similar to the lens section 416. The mounting bracket 404 includes tab openings 442 open at a top 444 of the mounting bracket 404 for receiving the locking tabs 418. In the illustrated embodiment, two tab openings 442 are provided on opposite sides of the mounting bracket 404. Each tab opening 442 opens to a corresponding tab slot 446 formed in the sidewall of the stem 422. The tab slots 446 receive the locking tabs 418 when the housing assembly 410 is rotated in locking direction. The tab slots 446 are defined, at least in part, by locking surfaces 448. When the housing assembly 410 is rotated, the locking tabs 418 engage the locking surfaces 448 of the tab slots 446. The locking surfaces 448 may be ramped or sloped to drive the housing assembly 410 towards the panel 402 as the housing assembly 410 is rotated in the locking direction. When the housing assembly 410 is rotated to the locked position, the locking surfaces 448 cover the locking tabs 418 to resist movement of the housing assembly 410 away from the panel 402. As such, the locking tabs 418 and the locking surfaces 448 cooperate to secure the housing assembly 410 to the mounting bracket 404.

Figure 11:
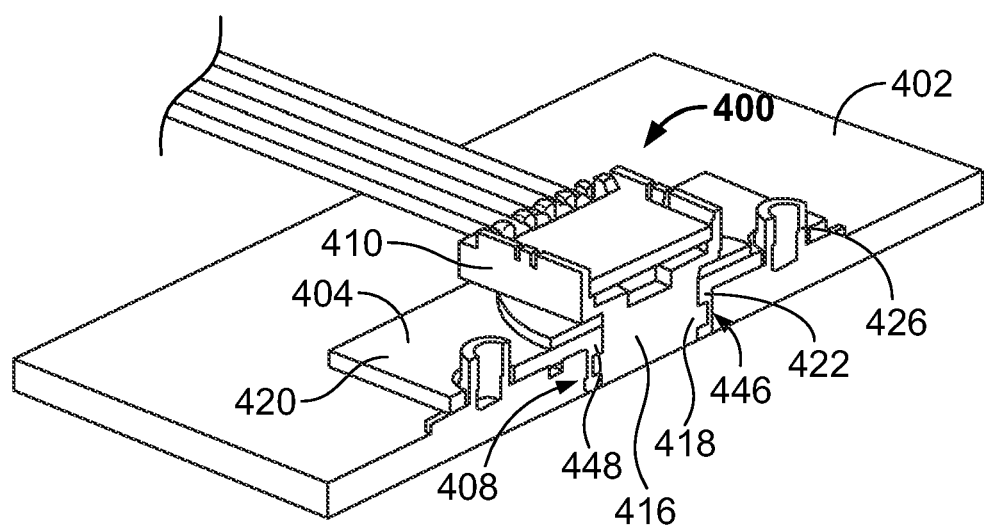
FIG. 11 is a section view of the lamp assembly of FIG. 10.

FIG. 11 is a section view of the lamp assembly 400 taken through the locking tabs 418 and the mounting posts 426. The mounting bracket 404 is coupled to the panel 402 such that the plate 420 rests against the panel 402. Optionally, the stem 422 may be received within the mounting opening 408 such that the lens section 416 is substantially flush with an outer surface of the panel 402 when the lamp assembly 400 is coupled to the panel 402. The end of the stem 422 may also be flush with the outer surface of the panel 402 when the mounting bracket 404 is coupled to the panel 402. The housing assembly 410 is coupled to the mounting bracket 404 to secure the lamp assembly 400 to the panel 402. FIG. 11 illustrates the locking tabs 418 within the tab slots 446. The locking tabs 418 engage the locking surfaces 448 to resist movement of the housing assembly 410 away from the panel 402.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A lamp assembly for mounting to a panel, the lamp assembly comprising:
   a housing assembly having a lamp section holding a light source assembly, and the housing assembly having a lens section extending from the lamp section, the lens section having a lens through which light from the light source assembly is directed, wherein the lens is configured to be received within a mounting opening of the panel; and
   a locking tab extending from an outer surface of the lens section, wherein the locking tab is configured to be received within the mounting opening of the panel and wherein the locking tab is configured to engage a locking surface to secure the housing assembly relative to the panel.

2. The lamp assembly of claim 1, wherein the housing assembly is rotated in a locking direction until the locking tab engages the locking surface and is in a locked position.

3. The lamp assembly of claim 1, wherein the locking tab is loaded through a tab opening defined within the mounting opening, the tab opening providing access to the locking surface.

4. The lamp assembly of claim 1, wherein the lens section is inserted into the mounting opening such that the locking tab passes through at least a portion of the panel to engage the locking surface.

5. The lamp assembly of claim 1, wherein the panel has an inner surface and an outer surface, the housing assembly being mounted to the panel such that the lens directs light in a direction from the inner surface to the outer surface, the locking tab engaging the locking surface outward with respect to the inner surface.

6. The lamp assembly of claim 1, wherein the panel defines the locking surface, the locking tab being configured to directly engage the panel to secure the housing assembly to the panel.

7. The lamp assembly of claim 1, further comprising a panel mounting member configured to be received within the mounting opening of, and secured to, the panel, the panel mounting member having a mounting cavity therein defining the locking surface, wherein the locking tab is received within the mounting cavity such that the locking tab engages the locking surface to secure the housing assembly to the panel mounting member.

8. The lamp assembly of claim 1, wherein the lamp section has a bottom, the housing assembly being mounted to the panel such that at least a portion of the panel is positioned between the locking tab and the bottom of the lamp section.

9. The lamp assembly of claim 1, wherein the lamp assembly includes a plurality of locking tabs, at least one of the locking tabs being of a different shape, the locking tabs being configured to provide keying as the lens section is loaded into the mounting opening of the panel.

10. The lamp assembly of claim 1, wherein the locking tab includes a ramp surface, the housing assembly being rotated to a locked position and the ramp surface rides along the locking surface as the housing assembly is rotated.

11. The lamp assembly of claim 1, wherein the housing assembly and the panel include orientation features that engage one another to hold the housing assembly in a proper position with respect to the panel.

12. The lamp assembly of claim 1, further comprising a gasket held between at least a portion of the housing assembly and the panel.

13. The lamp assembly of claim 1, wherein the lamp section includes a planar top defining an outer envelope of the housing assembly, the lamp section includes at least one wire groove configured to receive a corresponding wire for powering the light source assembly, wherein the wire groove receives the wire such that the wire is recessed below the top of the lamp section.

14. The lamp assembly of claim 1, wherein the locking tab is positioned proximate to the lens, the lens being configured to be positioned proximate an outer surface of the panel.

15. A lamp assembly for mounting to a panel, the lamp assembly comprising:
   a housing assembly having a lens section, a locking tab extends from an outer surface of the lens section,
   a panel mounting member configured to be received within a mounting opening of the panel, the panel mounting member being configured to be secured to the panel, the panel mounting member having a mounting cavity therein having a locking surface, wherein the locking tab is received within the mounting cavity such that the lens section is received within the mounting opening of the panel, and wherein the locking tab engages the locking surface to secure the housing assembly to the panel mounting member.

16. The lamp assembly of claim 15, wherein the panel mounting member is secured to the panel within the mounting opening.

17. The lamp assembly of claim 15, wherein the panel has an inner surface and an outer surface, the housing assembly being positioned along the inner surface with the lens section extending through the panel to the outer surface and directing light in an outward direction beyond the outer surface, the locking tab being positioned outward with respect to the inner surface.

18. The lamp assembly of claim 15, wherein the housing assembly has a top generally opposite the panel, the panel mounting member being entirely positioned below the top.

19. A lamp assembly for mounting to a panel having a mounting opening with two tab openings, the lamp assembly comprising:
   a housing assembly having a lens portion and locking tabs extending from an outer surface of the lens portion;
   wherein the lens portion of the lamp assembly is configured to be placed within the mounting opening so that the locking tabs fall into the tab openings; and
   wherein the lamp assembly is rotated in a locking direction so that the locking tabs lock the lamp assembly to the panel.

20. The lamp assembly of claim 19, wherein the lamp assembly further comprises a panel mounting member configured to be secured to the panel, the housing assembly being coupled directly to the panel mounting member, wherein the panel mounting member is entirely positioned below a top of the housing assembly.

\* \* \* \* \*